United States Patent
Muthiah

(10) Patent No.: US 8,026,310 B2
(45) Date of Patent: Sep. 27, 2011

(54) COATING POWDER OF EPOXY RESIN, STYRENE-MALEIMIDE CURING AGENT AND A SECOND CURING AGENT

(75) Inventor: Jeno Muthiah, Wayne, IL (US)

(73) Assignee: Alpha Coating Technologies, Inc, Addison, IL (US)

( * ) Notice: Subject to any disclaimer, the term of this patent is extended or adjusted under 35 U.S.C. 154(b) by 269 days.

(21) Appl. No.: 12/214,810

(22) Filed: Jun. 23, 2008

(65) Prior Publication Data

US 2008/0269430 A1    Oct. 30, 2008

Related U.S. Application Data

(63) Continuation-in-part of application No. 11/076,775, filed on Mar. 10, 2005, now abandoned.

(51) Int. Cl.
*C08L 63/00* (2006.01)
*C08L 63/02* (2006.01)
*C08L 63/04* (2006.01)

(52) U.S. Cl. .......................... 525/113; 525/109

(58) Field of Classification Search .................. None
See application file for complete search history.

(56) References Cited

U.S. PATENT DOCUMENTS

| | | |
|---|---|---|
| 5,714,206 A | 2/1998 | Daly et al. |
| 5,721,052 A | 2/1998 | Muthiah et al. |
| 5,824,373 A | 10/1998 | Biller et al. |
| 6,077,610 A | 6/2000 | Correll et al. |
| 6,113,980 A | 9/2000 | Laver |
| 6,537,671 B2 | 3/2003 | Muthiah |
| 6,703,070 B1 | 3/2004 | Muthiah et al. |

FOREIGN PATENT DOCUMENTS

| | | |
|---|---|---|
| JP | 4-266960 A | 9/1992 |
| JP | 8-134328 A | 5/1996 |

OTHER PUBLICATIONS

Product Bulletin: SMA® 3000I Resin, Sartomer Company, Exton, Pennsylvania, 2004.
Sartomer Application Bulletin SMA® Imide Resins SMA® 1000I, 2000I, 3000I and 4000I, Sartomer Company, Exton, Pennsylvania, 2004.
Sartomer Application Bulletin SMA® Imide Resins SMA® 1000I, 2000I, 3000I and 4000I, Styrene-dimethylaminopropylamine maliemide copolymers, Sep. 2004, 6 pages.
HCAPLUS accession No. 199787078 for the Polymer International article by Iijima et al., vol. 42, No. 1, 1997, two pages.
HCAPLUS accession No. 1997:428885 for the Nettowaku Porima article by Iijima et al., vol. 18, No. 2, 1997, one page.

*Primary Examiner* — Robert Sellers
(74) *Attorney, Agent, or Firm* — Gerald K. White

(57) ABSTRACT

A low temperature curable coating powder comprising an epoxy functional resin is cured with styrene maleimide in combination with at least one other curing agent such as dicyandiamide, imidazole, or an imidazole adduct. The combination of three curing agents such styrene maleimide, dicyandiamide, and an imidazole or imidazole adduct is useful for achieving gloss control. The coating powder may be curable at temperatures of 300° F. or lower. The coating of heat-sensitive and non-conductive substrates is facilitated with use of such coating powder, although other substrates, such as metal may be coated in accordance with the invention.

15 Claims, No Drawings

COATING POWDER OF EPOXY RESIN, STYRENE-MALEIMIDE CURING AGENT AND A SECOND CURING AGENT

This application is a continuation-in-part application of patent application Ser. No. 11/076,775, filed Mar. 10, 2005, and now abandoned.

FIELD OF INVENTION

This invention relates to resinous thermosetting coating powders, including those curable at low temperatures, such as about 300° F. or lower. The coating powder is curable with a styrene maleimide (SMAI) resin-curing agent and at least one other curing agent. When used alone as a curing agent, effective amounts of SMAI resin result in curing temperatures of about 300° F. or lower. The use of SMAI resin in combination with at least one other curing agent having a curing temperature greater than about 300° F. lowers the curing temperature that would be required should the other curing agent be used alone. Such lowered curing temperature, for example, facilitates use of the coating powder to coat heat-sensitive substrates, as well as other substrates.

BACKGROUND OF THE INVENTION

Although powder coatings have many benefits, it is difficult to coat temperature-sensitive substrates such as plastic, wood, wood composites, and thin cross sections of metal substrates, because normally employed curing temperatures result in damage to such substrates. Thus, the field of powder coating has been active in the development of low curing temperature coating powder to avoid such damage. During the past several years, new technologies have been introduced for providing low temperature cure powder coatings. U.S. Pat. Nos. 5,714,206 and 6,077,610 involve two-component coating powders that can be cured at the low temperatures required for wood and a variety of other metallic and non-metallic substrates. This result is achieved by mixing resin and curing agent components following extrusion in the dry form. The procedure eliminates heating, and thus reaction, of the two components together until they are deposited on the substrate. U.S. Pat. No. 6,703,070 involves a one-component, low curing temperature coating powder. U.S. Pat. No. 5,721,052 discloses epoxy resins cured with imidazole adducts to obtain low temperature cure powder coatings, especially black textured coatings. U.S. Pat. No. 5,824,373 discloses UV curable powder coating to further reduce cure temperatures through the use of UV radiation curing. All of the above patents address the low cure temperature aspect of the powder coatings for heat-sensitive substrates and thus address the problem of substrate degradation at normally used higher powder coating cure temperatures.

The present invention addresses the coating of heat-sensitive substrates, as well as other types of substrates, with use of a novel coating powder comprising SMAI resin, alone or in combination with a second curing agent. Such curing agent(s) result in low curing temperatures, thus facilitating the use of the coating powder for heat-sensitive and other types of substrates. The coating powder of the invention may be produced as a one- or multiple-component powder.

SUMMARY OF THE INVENTION

The present invention generally involves a thermosetting coating powder comprising a resin, an optional epoxy functional compound, and an effective amount of SMAI to cure the coating powder. When the optional compound is not present, the resin comprises an epoxy functional resin. SMAI may be used alone as the curing agent or in combination with a second curing agent. The SMAI curing agent serves to lower the curing temperature of the coating powder when compared with using a second curing agent alone. Curing temperatures of about 300° F. or lower and medium and low gloss coatings may be achieved by the invention.

The present invention also pertains to substrates coated with the coating powders of the invention.

The present invention also pertains to a method of producing a cured coating on a substrate, such as a heat-sensitive substrate. Medium and low gloss coatings may be obtained in accordance with the invention. The method comprises providing thermosetting coating powders as described above, applying the powder to a substrate, and then heating to a temperature sufficient to cure the coating powder. The invention may be advantageously used to coat heat-sensitive substrates and to produce medium and low gloss coatings, such as those having gloss levels below 50 units at 60 degrees.

The present invention also pertains to a coating powders and a method for achieving gloss control through the use of two or more curing agents in the coating powder composition. Low gloss coatings such as 40 and below may be obtained through the use of two curing agents with or without a third curing agent, without need for a gloss control agent. However, conventional gloss control agents may or may not be used in combination with such curing agents.

DETAILED DESCRIPTION OF THE INVENTION

The invention pertains epoxy functional resins such as epoxy cresol novolac, epoxy phenol novolac, hydrogenated bisphenol A epoxy resin, brominated bisphenol epoxy resin, epoxy resins in combination with polyester resins forming hybrids, triglycidyl isocyanurate with carboxyl polyester resins, glycidyl methacrylate (GMA) resins, and admixtures thereof.

Epoxy resins are well established in the art. For example, epoxy resins included in U.S. Pat. No. 5,714,206 are exemplified by, but not limited to, those produced by the reaction of epichlorohydrin and a bisphenol, e.g., bisphenol A. Preferred epoxy resins include those sold under the trademarks ARALDITE GT-7072, 7004, 3032, 6062, and 7220, and EPON 1007F, 1009F, and 1004, all of which are 4,4'-isopropylidenediphenol-epichlorohydrin resins. Another typical epoxy resin system, shown in U.S. Pat. No. 5,721,052, constitutes another example of a system that can be used in the present invention. Such epoxy resins are solid resins or blends of solid and small amounts of liquid resins up to about 10 wt. % which resins are the reaction products of a diol and a halohydrin. Suitable epoxy resins are exemplified by, but not limited to, the reaction products of bisphenol A and epichlorohydrin. Generally, the bisphenol A type epoxies used herein are of the type 1 to type 9 form, with the low viscosity type 3 or less epoxy resins being most preferred. The useful bisphenol A type epoxy resins have an epoxy equivalent weight ranging between about 400 and 2.250, preferably an epoxy equivalent weight of between about 450 and 1.100, with an epoxy equivalent weight of between about 500 and 750 being most preferred. Preferred epoxy resins include those sold under the trade name Araldite GT 7013 (type 3) and Araldite GT 7072 (type 2) by Huntsman Corporation, which are both 4,4'-isopropylidene-diphenol-epichlorohydrin type epoxy resins.

Epoxy cresol novolac and epoxy phenol novolac resins can be used solely or in combination with other resins to increase crosslink density and provide faster gel time. An example of such resin is GT 6259 from Huntsman Corporation. GMA resins (such as PD 7690 from Anderson Chemical Corporation) can be used in the present invention for providing epoxy functionality. Hydrogenated bis A epoxy resin and GMA resins can provide excellent durability when exposed to sunlight. Brominated epoxy resins, such as RSS 1407 from Shell Chemical, can provide improved smoothness. Triglycidyl isocyanurate (TGIC), such as PT 810 from Huntsman Chemical Corporation, can be used along with carboxyl functional polyester resin providing epoxy functionality.

When an epoxy functional resin is not present in the coating powder, an epoxy functional compound is included in the coating powder. Thus, non-epoxy functional resins such as polyester resins, acid functional acrylic resins, and admixtures thereof may be utilized instead of an epoxy functional resin. Such epoxy functional compound may comprise any epoxy functional compound that is a solid at room temperature. Examples of such epoxy functional compounds include TGIC, GMA, and admixtures thereof. A hybrid formulation will be included should the epoxy functional compound be a bis A type epoxy resin. The epoxy functional compound may also be TGIC, leading to TGIC formulations. For formulations containing GMA resins, carboxylic acid functional curing agents such as dodecane dioic acid or sebacic acid can be used. SMAI curing agents are effective in such systems, as well as in epoxy functional resin systems.

Curing agents for the epoxy functional resins of the invention comprise SMAI resin. Such resin is a low molecular weight copolymer of styrene and dimethylaminopropylamine maleimide. Mole ratios range from about 1 styrene:1 dimethylaminopropylamine maleimide to about 1 styrene 4 dimethylaminopropylamine maleimide. The various mole ratios involve different concentrations of amine functionality and, hence, different cure speeds. SMAI resins having a mole ratio of about 3 styrene:1 dimethylaminopropylamine maleimide (SMAI 3,000) may conveniently be utilized in the compositions of the invention. SMAI resins may be obtained from Sartomer Company, Exton, Pa. These resins are fully imidized and contain only trace levels of anhydride or acid functionality. These resins typically have molecular weights ranging from about 5,000 to about 10,000. Moreover, the glass transition or softening point temperatures of these resins are less than about 100° C. and have low melt viscosities. Imide functional groups have excellent thermal stability with decomposition temperatures greater than about 300° C.

Styrene maleic anhydride (SMA) resins and SMAI resins are described in a Product Bulletin published by Sartomer Company. SMA resins may be converted to SMAI resins by reaction of the SMA resins with dimethylpropyl or other diamines containing one primary amine and one tertiary amine. The Product Bulletin suggests use of SMAI resins as accelerators or catalysts for formulations containing both epoxy resins and SMA resins and further discloses that the use of amounts of one part per 100 parts resin (Phr.) may be used to accelerate curing. SMA resins are stated to be useful as curing agents with epoxy resin formulations for applications, such as printed wiring board prepegs and powder coatings. Typically, small molecule additives such as imidazoles or tertiary amines are used to speed the epoxy-anhydride cross linking reaction. SMAI resins contain tertiary amine functionality. As such, they are described in the Product Bulletin to function as anhydride-epoxy catalysts.

As will be seen, the present invention utilizes SMAI resins as a curing agent rather than as a curing catalyst. As known in the art, a catalyst is not consumed in the reaction and thus used in very small quantities, on the order of or less than 1 Phr.

Thus, the coating powder compositions of the invention contain an effective amount of the SMAI resin to effect curing when used alone, or in combination with another curing agent. When used as a single curing agent, SMAI should be present in a minimum amount of at least 5 Phr. to achieve gel times of 10 minutes or less at 300° F. Typically, SMAI resins, when used alone, may be present in amounts from about 5 to about 25 Phr. When used in combination with a second (or more) curing agent, SMAI resins may be present in a minimum amount of about 3 Phr. to achieve gel times of 10 minutes or less at 300° F. Typically when used in combination, SMAI resins may be present in amounts from about 3 to about 25 Phr. It is believed that no advantage is achieved by including more than about 25 Phr. of SMAI resin in the coating powder.

SMAI resin curing agents, when used alone, may impart a yellowish color to cured coatings. If color is not a desired characteristic of a coated substrate, the yellowish color is not a problem. Moreover, should a black color be desired, the yellowish color is hidden and is not a problem. However, for desired coated colors where yellowing is a problem, it is advantageous to include a second curing agent, such as described below, because incorporation of such second curing agent serves to minimize or eliminate the yellowing and thus permits the desired color to be obtained.

The second curing agent varies with a type of epoxy compound used in the formulation. Such first types of second curing agent may be dicyandiamide, modified dicyandiamide, derivatives of dicyandiamide, modified aromatic polyamines (for example, monosalts of aromatic polycarboxylic acids), modified aliphatic polyamines (for example, 2 phenyl 2-imidazoline, polyphenols, such as DEH 84 available from Shell Chemicals), acid anhydrides (including poly and acid anhydrides), acid functional polyester resins, and admixtures thereof. Examples of such curing agents include CG 1400 S, Ancamine 2441, Ancamine 2014 from Air Products and Chemicals, DT 3368 from Degussa Chemical Corporation. The second type of second curing agent may also comprise of imidazoles, 2-methyl imidazole, imidazole adducts, and admixtures thereof.

It is also contemplated to add a third curing agent to compositions having a first and second curing agent for the purpose of achieving gloss control. Normally gloss control is achieved with matting agents or gloss control agents such as styrene acrylic resins and various known waxes. As demonstrated at a later portion of the present application in Example IV, gloss may be controlled with a combination of a styrene maleimide first curing agent and one or two additional curing agents (for example the first and second types of second curing agents identified in the preceding paragraph, e.g., dicyandiamide and imidazole adduct), in proportions appropriate to achieve a desired gloss. Gloss control agents are optionally included.

Typical ranges for the combination of two curing agents are styrene maleimide about 5 phr to 25 phr, first type of second curing agent 1 phr to 8 phr, and the second type of curing agent about 5 phr to 10 phr. When a third curing agent is added to a composition containing a first and second curing agent for purposes of gloss control, styrene maleimide is present in amounts of about 5 phr to 25 phr, the first type of curing agent is present in amounts from 1 about 1 phr to 8 phr, and the second type of curing agent is present in amounts from about 1 phr to 10 phr.

When SMAI is used with a second curing agent, sufficient quantities of both curing agents are used to effect curing at 300° F. or less, or at a higher curing temperature.

The coating composition of the invention may be made by blending the various components, melt extruding the blended components to form a film having a homogenous composition, and then grinding such film to form particles of coating powder having a homogenous composition of any desired size distribution. Even though the resultant coating powder has a low curing temperature, such as 300° F. or lower, curing does not occur during the extrusion step; and thus a single component powder may be formed. Alternatively, the coating powder of the invention may be made as a two-component mixture where the resin and at least one or both of the curing agents are produced as separate particles and then mixed or blended together to form a coating powder comprising a mixture of particles having different compositions.

In any event, whether a one- or two-component coating powder is used, the coating powder is applied to a substrate, such as a heat-sensitive substrate, and then heated to cure the applied powder and form a cured coating upon the substrate. Coatings providing 60 degree gloss levels below about 50 units were also obtained thereby. Without the presence of the SMAI resin curing agent with the second curing agent, a higher cured gloss coating would have been obtained. Thus, the use of SMAI curing agents permits gloss control that would not be obtainable without use of such material. By altering the relative proportions of SMAI and the other curing agent, different degrees of gloss may be obtained.

When SMAI is used by alone, gloss levels in the range of about 5 to about 30 are typically achieved. With use of other curing agents, such as a phenolic curing agent, in combination with SMAI, gloss levels can be increased to about 50 in bis A containing epoxy formulations. For the present invention, gloss levels in the range of about 50 or less are considered to be low gloss. Such gloss determinations measured at 60 degrees. A BYK—Gardener micro gloss meter may be used for such gloss measurement. Lowered gloss is a desirable property because achieving low gloss at lower curing temperatures is very difficult with current low temperature curing coating powders. The use of SMAI at more than catalytic levels, alone or in combination with a second curing agent, provides both low temperature cure and medium-to-low gloss finishes when curing is conducted at low temperatures, such as about 300° F. or less.

The composition of the coating powder of the invention optionally include inert nitrogen-containing compounds that function to enhance the electrostatic charge that may be imparted to the coating powder particles prior to being applied to a substrate. Such compounds include, but are not limited to, melamine, urea, benzoguanamine, and derivatives of melamine, derivatives of urea, and derivatives of benzoguanamine. Such compounds typically are included in amounts ranging from about 1 to about 30 Phr. Further detail may be found in U.S. Pat. No. 6,667,032. It is also contemplated that the hindered amine electrostatic charge enhancing agents set forth in U.S. Pat. No. 6,113,980 may be utilized. Electrostatic charge enhancing agents are particularly desirable when present in a coating powder intended to be used for coating heat sensitive and/or non-conductive substrates.

In addition to the above-described thermosetting resin polymer and curing agents, the coating powder composition may optionally include as another component, a texturing agent for achieving the desired grainy textured effect of the finish. The texturing agents which may be employed in the thermosetting powder coating compositions of the present invention are exemplified by, without limitation, organophilic clays, such as an organophilic clay sold under the trade name Bentone 27 and Bentone 38 by NL Chemicals, which are trialkylarylammoniumhectorite and tetraalkylammoniumsmectite, respectively, rubber particles, such as acrylonitrile butadiene copolymers, including those sold under the trade name Nipol 1422 and 1411 by Zeon Chemicals, and thermoplastic polymers, such as polypropylene. The amount of texturing agent used determines the coarseness or fineness of the texture. The texturing agent is used in a range up to about 30 Phr., preferably between about 1 and about 20 Phr., and most preferably between about 2 and about 10 Phr. If rubber particles are used as the texturing agent, it is generally preferred to incorporate them in the powder coating composition in an amount ranging between about 5 and about 30 Phr., and more preferably between about 10 and about 20 Phr. It is believed that the texturing agent contributes to the high viscosity and low melt flow of the powder coating composition leading to the textured finish and, thus, provides for better edge coverage and hiding of surface imperfections of wood substrates.

The thermosetting powder coatings of the present invention may also desirably include as another component, a flow control agent. The flow control agents, which may be employed in the thermosetting powder coating compositions, are exemplified by, without limitation, acrylic resins. These acrylic resins are generally liquids, which have been converted to powder form by absorption onto silica-type materials. A preferred flow control agent is sold under the trade name Resiflow P-67 acrylic resin by Estron Chemical, Inc., which is a 2-propenoic acid, ethyl ester polymer. Another preferred flow control agent is sold under the trade name Benzoin by DSM, Inc., which is a 2-hydroxy-1.2-diphenylethanone crystalline sold that is believed to keep the molten coating open for a suitable time to allow outgassing to occur prior to the formation of the hard set film. The flow control agent is used in a range between about 1 and about 5 Phr., preferably between about 1.5 and about 2.5 Phr.

Fumed silica and aluminum oxide may also be included as a powder dry flow additive. An example of fumed silica is sold under the trade name Cab-O-Sil by Cabot Corporation. An example of aluminum oxide is sold under the trade name Aluminum Oxide C by Degussa Corporation.

In addition, the thermosetting powder coating compositions may contain pigments as another component. Any of the usual pigments may be employed in the thermosetting powder coating of the invention to obtain the desired color and opacity. Examples of useful pigments for the black textured powder coatings include, without limitation, carbon black and black iron oxide. A preferred carbon black pigment is sold under the trade name Raven 22 and Raven 1255 by Columbian Chemical Company. An example of a useful pigment for white textured powder coatings include, without limitation, titanium dioxide. The pigment is used in a range up to about 100 Phr., more preferably between about 1 and about 4 Phr. for a black textured finish and between about 15 and about 80 Phr. for a white textured finish.

The thermosetting powder coating compositions of this invention may contain extenders or fillers as another component. If a textured finish is desired, the extender loading can be rather high to lower the melt flow of the powder coating and allow the molten coating to cure while retaining some of the finish of the powder particles as applied. The level of extenders can also be used to control the coarseness or fineness of the finish. The extenders which may be employed in the thermosetting powder coating compositions of the present invention are exemplified by, without limitation, calcium carbonate, barium sulfate, wollastonite, and mica. The extender is used in a range up to about 120 Phr., more preferably between about 10 and about 80 Phr.

In addition to the above components, the thermosetting powder coating compositions of this invention may also contain the usual additives common to powder coatings. These additives include, without limitation, gloss control waxes, such as polyethylene; slip additives, such as Teflon and siloxanes; heat stabilizers; and anti out gassing agents.

Examples of suitable heat sensitive substrates useful in the present invention include wood, such as hardwood, hard board, laminated bamboo, wood composites, such as particle board, electrically conductive particle board, fiber board, medium density fiber board, masonite board, laminated bamboo, and other substrates that contain a significant amount of wood. Wood substrates are typically used in kitchen cabinetry, shelving and storage units, home and business furniture, computer furniture, etc. Other suitable heat sensitive substrates include plastics, such as ABS, PPO, SMC, polyolefins, acrylics, nylons and other copolymers which usually will warp or outgas when coated and heated with traditional heat curable powders. The plastics are typically used in automotive parts. Still other heat sensitive substrates include paper, cardboard, and composites and components with a heat sensitive aspect, and the like. In addition, metallic substrates of thin cross section may be advantageously coated with the coating powders of the invention. Finally, the present invention may be used to form a coating on any substrate, including metal substrates, because energy savings obtained during coating result from lower curing temperatures.

In addition to coating non-conductive substrates, it is also contemplated that the coating powders of the invention can advantageously be used to coat conductive substrates, such as thin metal substrates, where it is desired to cure the coating at temperatures below about 300° F. to prevent damage, such as warpage, to the thin substrate. Other conductive substrates such as those having complex shapes, can beneficially use the coating powders of the invention due to enhanced chargeability. The coating powders of the present invention also can advantageously be used to coat substrates having corners and other difficult-to-coat portions. Curing temperatures less than or greater than 300° F. can be used.

The coating powders of the present invention are applied in dry, free flowing, solid powder form over the substrate to be coated. Preferably, the powders are sprayed onto the substrate by well known electrostatic powder spray techniques, such as corona discharge or triboelectric electrostatic spray techniques.

Next, the powders are exposed to sufficient heat to melt, level and flow out the powders into a continuous molten film having the desired smoothness, and activate the cure. Heating may take place in either infrared or convection ovens, or a combination of both. Sufficient outgassing of substrate volatiles simultaneously occurs during the flow out step to eliminate surface defects, such as blisters and pinholes.

The following Examples are presented to provide a further understanding of the present invention.

All samples are weighed in grams and are extruded in a single screw extruder and are cooled into flakes by passing the extrudate through chill rolls. The flakes are then ground and screened to a desired particle size. Geltime measurements are taken on a hot plate maintained at 300° F. Products having gel times of 10 minutes or more at 300° F. are considered to be not practical because it is difficult to maintain wood substrates at this temperature without degradation.

Example I

The following formulations used in this example involve the use of SMAI 3000 as a catalyst (sample A) and as a curing agent (samples B-E).

| | Sample | | | | |
|---|---|---|---|---|---|
| | A | B | C | D | E |
| GT 7072 (1) | 300 | 300 | 300 | 300 | 300 |
| P 67 (2) | 4.2 | 4.2 | 4.2 | 4.2 | 4.2 |
| Pigments and Fillers | 6.0 | 6.0 | 6.0 | 6.0 | 6.0 |
| SMAI 3000 (3) | 3.0 | 9.0 | 15.0 | 30 | 45 |
| SMA (4) | 30.0 | | | | |
| Geltime at 300° F. | No gellation | No gellation | 6 mins | 3 mins, 35 secs | 2 mins |

(1) Bis A type epoxy resin from Huntsman Chemicals
(2) Flow control agent from Estron Chemicals
(3) SMA resin supplied by Sartomer Company
(4) SMAI resin supplied by Sartomer Company Sample A is representative of the formulation recommended in the above-mentioned product Product Bulletin published by Sartomer. As can be seen, SMAI 3000, when used at catalytic levels, does not result in curing for up to 10 minutes. This formulation is not be useful for coating heat-sensitive substrates. When used alone as a curing agent, at 5 Phr., a gel time of approximately six minutes is achieved. Upon an increase to 5 Phr., 10 Phr., and 15 Phr., gel times are reduced significantly as shown in samples C-E.

Example II

This Example illustrates the use of SMAI 3000 in combination with other curing agents.

| | Sample | | | | | |
|---|---|---|---|---|---|---|
| | F | G | H | I | J | K |
| Yd 012 (1) | 300 | 300 | 300 | 300 | 300 | |
| P 67 | 4.2 | 4.2 | 4.2 | 4.2 | 4.2 | 4.2 |
| GT 7013 (2) | | | | | | 300 |
| Pigments and Fillers | 6 | 6.0 | | | | |
| SMAI 3000 (3) | 6.0 | 9.0 | 36 | 36 | 45 | 40 |
| CG 1400S (4) | 15 | 15 | 15 | 15 | | 15 |
| SCX 848 (5) | | | | 12 | | |
| DEH 84 (6) | | | | | 60 | |
| Geltime at 300° F. | 4 mins, 50 secs | 3 mins, 30 secs | 50 secs | 42 secs | 45 secs | 30 secs |
| 60 degree Gloss | 55 | 35 | 30 | 17 | 52 | 18 |

(1) Epoxy resin from Kukdo Chemicals
(2) 3 type epoxy Resin from Huntsman chemicals
(3) SMAI from Sartomer Company
(4) Dicyandiamide from Air Products and Chemicals
(5) Styrene Acrylic acid copolymer from SC Johnson Corporation
(7) Phenolic Curing agent for Epoxy resins Samples F, G, and H illustrate that at greater than catalytic levels and in combination with other curings agents, formulations with gel times of less than 10 minutes are developed. The samples are applied to MDF panels, which are preheated to a surface temperature of about 160° F. and are cured in an oven by bringing the surface temperature up to 300° F. for two to five minutes. Coatings with gloss levels around 50 or less, at 60 degree angle, are produced from these samples. Sample I illustrates that other gloss control agents, such as SCX 848, may be used to further control gloss. Sample J utilizes a phenolic curing agent along with SMAI 3000. Sample K utilizes a 3 type epoxy resin with SMA 3000 I resin.

Example III

This Example illustrates the use of SMAI 3000 in combination with TGIC and GMA containing formulations.

|  | Sample | |
| --- | --- | --- |
|  | L | M |
| SP 6400 (1) | 260 |  |
| P 67 | 4.2 | 4.2 |
| Pigments and Fillers | 65 | 6.0 |
| SMAI 3000 | 20.0 | 45 |
| PT 810 (2) | 40 |  |
| PD 7690 (3) |  | 300 |
| Sebacic Acid (4) |  | 54.0 |
| Geltime at 300° F. | 2 mins 20 secs | 3 mins |

(1) Carboxyl polyester from Sun Polymers
(2) Triglycidyl Isocyanourate from Huntsman Chemicals
(3) Glycidyl methacrylate resin from Huntsman Chemicals Samples L and M illustrate that the concept of the invention is applicable for formulations containing other epoxy functional compounds, such as TGIC and GMA, in facilitating curing at 300° F.

Example IV

This example illustrates the use of a SMA 30001 curing agent alone, a dicyanadimide curing agent alone, a SMA 30001 curing agent with a dicycandiaminde curing agent, a SMA 30001 curing agent with an imidazole adduct curing agent, a dicycandiaminde curing agent with an imidazole adduct curing agent, a SMA 30001 curing agent with a dicycandiaminde curing agent and an imidazole adduct curing agent and The following seven coating powder Samples were formulated, melt extruded, ground into powder, applied to a MDF substrate, and cured 350 degrees F. for 5 minutes. The weights expressed in the following table are in grams.

|  | Sample No. | | | | | | |
| --- | --- | --- | --- | --- | --- | --- | --- |
|  | 135-22-1 | 135-26-1 | 135-22-2 | 135-22-3 | 135-22-4 | 135-22-5 | 135-22-6 |
| KD 242 G (epoxy resin) | 300 | 300 | 300 | 300 | 300 | 300 | 300 |
| P 67 (flow modifier) | 4.2 | 4.2 | 4.2 | 4.2 | 4.2 | 4.2 | 4.2 |
| Benzoin (outgassing agent) | 2.4 | 2.4 | 2.4 | 2.4 | 2.4 | 2.4 | 2.4 |
| Kemira 660 (white pigment) | 150 | 150 | 150 | 150 | 150 | 150 | 150 |
| AO 68 (heat stabilizer) | 4.8 | 4.8 | 4.8 | 4.8 | 4.8 | 4.8 | 4.8 |
| SMA 3000I | 45 |  | 30 | 30 |  | 15 | 15 |
| Dicyandiamide |  | 15 | 15 |  | 15 | 15 | 15 |
| Imidazole adduct in epoxy resin |  |  |  | 15 | 30 | 15 | 15 |
| Styrene Acrylic resin (gloss reducer) |  |  |  |  |  |  | 30 |

The Samples were then tested as set forth below:

|  | Sample No. | | | | | | |
| --- | --- | --- | --- | --- | --- | --- | --- |
|  | 135-22-1 | 135-26-1 | 135-22-2 | 135-22-3 | 135-22-4 | 135-22-5 | 135-22-6 |
| Solvent resistance | No rub off | Severe rub off | No rub off | No rub off | No rub off | No rub off | No rub off |
| Gloss | 70 | 75 | 6 | 60 | 85 | 55 | 15 |
| Blue (1) |  | −5.3 | −3.11 | −0.88 | −4.45 | −3.37 | −3.05 |

(1) All samples were tested against Sample 135-22-1 as the standard. Positive values indicate yellowness and negative values indicate blueness.

Sample 135-22-1 which had 45 grams (15 phr) of SMA 30001 cured well with a gloss of 70. However, this Sample did not exhibit an acceptable appearance, primarily due to yellowness.

Sample 135-26-1 containing 15 grams (5 phr) of dicyandiamide did not cure as indicated by the solvent resistance results. As noted in Sample 135-22-2, the combination of SMA 30001 curing agent with dicyandiamide resulted in curing.

Surprisingly, when 15 grams (5 phr) of the SMA 30001 curing agent was replaced with 15 grams (phr) of dicyandiamide curing agent (Sample 135-22-2), gloss was greatly reduced to 6 while coating appearance and cure were maintained. This result is considered to be unique and unexpected because SMA 30001 and dicyandaiamide, when used individually (see Samples 135-22-1 and 135-26-1), do not produce low gloss coatings. In addition, yellowing was reduced markedly by the combination of SMA 30001 and dicyandiamide. This result indicates that the combination of styrene maleimide and dicyandiamide curing agents, without the presence of a gloss control agent, is capable of achieving low gloss coatings on the order of 40 or lower.

When SMA 3000I curing agent was used in combination with another type of curing agent, such as an imidazole adduct (Sample 135-22-3), coating appearance improved while high gloss and cure were maintained. This result led to the possibility of achieving gloss control by replacing a further portion of the SMA 30001 curing agent in Sample 135-22-2 with an imidazole adduct curing agent. Such three curing agent combination is exemplifies in Sample 135-22-5. The results in this Sample indicate that we can gloss control can be achieved without affecting cure and the appearance of the coating.

The results obtained for Sample 135-22-6 indicate that conventional gloss reducing agents can be further used to reduce gloss.

Normally, gloss control is achieved with matting agents or gloss control agents such as the styrene acrylic resins and various known waxes. The above results indicate that gloss may be controlled with a combination of styrene maleimide and one or two additional curing agents (for example dicyandiamide and an imidazole adduct or an imidazole) in proportions appropriate to achieve a desired gloss.

It is claimed:

1. A thermosetting coating powder comprising an epoxy functional resin, from about 3 to 25 Phr of a first curing agent and a second curing agent to cure said coating powder; said first curing agent comprising a copolymer of styrene and dimethylaminopropylamine maleimide in a mole ratio from about 1 styrene:1 dimethylaminopropylamine maleimide to about 1 styrene:4 dimethylaminopropylamine and having tertiary amine functionality.

2. The thermosetting coating powder of claim 1, wherein said second curing agent is a member selected from the group consisting of dicyandiamide, derivatives of dicyandiamide, modified aromatic polyamines, modified aliphatic polyamines, polyphenols, acid functional polyester resins, phenolics, and admixtures thereof.

3. The thermosetting coating powder of claim 1, wherein said second curing agent is a member selected from the group consisting of imidazoles, 2-methyl imidazole, imidazole adducts, and admixtures thereof.

4. The thermosetting coating powder of claim 2, wherein said second curing agent comprises dicyandiamide.

5. The thermosetting coating powder of claim 3, wherein said second curing agent comprises an imidazole.

6. The thermosetting coating powder of claim 3, wherein said second curing agent comprises an imidazole adduct.

7. The thermosetting coating powder of claim 2, wherein said coating powder further includes an imidazole curing agent.

8. The thermosetting coating powder of claim 2, wherein said coating powder further includes an imidazole adduct curing agent.

9. The thermosetting coating powder of claim 1, wherein said copolymer of styrene and dimethylaminopropylamine maleimide is in a mole ratio of about 3 styrene:1 dimethylaminopropylamine maleimide.

10. The thermosetting coating powder of claim 1, herein said epoxy functional resin is a member selected from the group consisting of, epoxy cresol novolac, epoxy phenol novolac, hydrogenated bisphenol A epoxy resin, brominated bisphenol A epoxy resin, epoxy resins in combination with polyester resins forming hybrids, triglycidyl isocyanurate with carboxyl polyester resins, glycidyl methacrylate resins, and admixtures thereof.

11. The thermosetting coating powder of claim 3, wherein said second curing agent is a member selected from the group consisting of imidazoles, imidazole adducts, and admixtures thereof.

12. The thermosetting coating powder of claim 11, wherein said second curing agent comprises an imidazole.

13. The thermosetting coating powder of claim 11, wherein said second curing agent comprises an imidazole adduct.

14. The thermosetting coating powder of claim 1, wherein said coating powder further includes a third curing agent comprising an imidazole.

15. The thermosetting coating powder of claim 1, wherein said coating powder further includes a third curing agent comprising an imidazole adduct.

* * * * *